(12) United States Patent
Gaiser

(10) Patent No.: US 12,049,839 B2
(45) Date of Patent: Jul. 30, 2024

(54) EXHAUST GAS HEATING UNIT

(71) Applicant: Purem GmbH, Neunkirchen (DE)

(72) Inventor: Gerd Gaiser, Reutlingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/545,786

(22) Filed: Dec. 8, 2021

(65) Prior Publication Data

US 2022/0178290 A1 Jun. 9, 2022

(30) Foreign Application Priority Data

Dec. 9, 2020 (DE) ...................... 10 2020 132 800.1

(51) Int. Cl.
*F01N 3/021* (2006.01)
*B01D 53/94* (2006.01)
(Continued)

(52) U.S. Cl.
CPC ....... *F01N 3/2013* (2013.01); *B01D 53/9418* (2013.01); *B01D 53/944* (2013.01);
(Continued)

(58) Field of Classification Search
CPC .............. B01D 53/9418; B01D 53/944; B01D 53/945; B01D 2255/1021; B01D 2255/1023; B01D 2255/1025; B01D 2255/2042; B01D 2255/20707; B01D 2255/20715; B01D 2255/20723; B01D 2255/20738; B01D 2255/20761; B01D 2255/2092; B01D 2255/50;
(Continued)

(56) References Cited

U.S. PATENT DOCUMENTS 5,384,099 A * 1/1995 Sheller .................. F01N 3/2814
422/174
5,628,928 A * 5/1997 Rolf ........................ H05B 3/10
422/174
(Continued)

FOREIGN PATENT DOCUMENTS

CN 110139972 A 8/2019
DE 10 2019 107 384 A1 9/2020
(Continued)

OTHER PUBLICATIONS

Office action of the Chinese Patent Office dated Jul. 29, 2023 in corresponding Chinese patent application 202111494953.4.

*Primary Examiner* — Phutthiwat Wongwian
*Assistant Examiner* — Diem T Tran
(74) *Attorney, Agent, or Firm* — Walter Ottesen, P.A.

(57) ABSTRACT

The disclosure is directed to an exhaust gas heating unit for an exhaust gas system of an internal combustion engine. The exhaust gas heating unit includes at least one electrically conductive heating conductor element, wherein the at least one electrically conductive heating conductor element is configured from bent flat strip material. The exhaust gas system conducts exhaust gas defining an exhaust gas primary flow direction (H). The heating conductor element can have a plurality of broad sides arranged to be substantially parallel to the exhaust gas primary flow direction (H) and a plurality of end faces arranged substantially orthogonally to the exhaust gas primary flow direction (H).

23 Claims, 11 Drawing Sheets

(51) Int. Cl.
*F01N 3/10* (2006.01)
*F01N 3/20* (2006.01)
*F01N 3/28* (2006.01)

(52) U.S. Cl.
CPC .......... *B01D 53/945* (2013.01); *F01N 3/021* (2013.01); *F01N 3/101* (2013.01); *F01N 3/2066* (2013.01); *F01N 3/2803* (2013.01); *B01D 2255/1021* (2013.01); *B01D 2255/1023* (2013.01); *B01D 2255/1025* (2013.01); *B01D 2255/2042* (2013.01); *B01D 2255/20707* (2013.01); *B01D 2255/20715* (2013.01); *B01D 2255/20723* (2013.01); *B01D 2255/20738* (2013.01); *B01D 2255/20761* (2013.01); *B01D 2255/2092* (2013.01); *B01D 2255/50* (2013.01); *B01D 2255/91* (2013.01); *F01N 2370/04* (2013.01)

(58) Field of Classification Search
CPC .......... B01D 2255/91; B01D 53/9431; B01D 53/9454; F01N 2240/16; F01N 2330/02; F01N 2330/323; F01N 2330/40; F01N 2370/02; F01N 2370/04; F01N 3/021; F01N 3/027; F01N 3/0814; F01N 3/101; F01N 3/103; F01N 3/2013; F01N 3/2026; F01N 3/2066; F01N 3/2803; Y02T 10/12
See application file for complete search history.

(56) References Cited

U.S. PATENT DOCUMENTS

| | | | |
|---|---|---|---|
| 5,672,324 | A | 9/1997 | Okamoto et al. |
| 11,131,227 | B2 | 9/2021 | Everly et al. |
| 2012/0097659 | A1* | 4/2012 | Duesterdiek ........ F01N 13/0097 |
| | | | 219/520 |
| 2014/0322090 | A1 | 10/2014 | Brueck et al. |
| 2017/0273146 | A1 | 9/2017 | Everly et al. |
| 2018/0119591 | A1* | 5/2018 | Everly .................... H05B 3/48 |
| 2018/0128144 | A1 | 5/2018 | Hirth et al. |
| 2020/0300141 | A1 | 9/2020 | Gaiser |

FOREIGN PATENT DOCUMENTS

| | | |
|---|---|---|
| EP | 3 532 714 B1 | 9/2019 |
| JP | H0559939 A | 3/1993 |
| JP | H06-154623 A | 6/1994 |
| JP | 2008-14239 A | 1/2008 |
| WO | 2017/005579 A1 | 1/2017 |
| WO | 2017/151975 A1 | 9/2017 |

* cited by examiner

EXHAUST GAS HEATING UNIT

CROSS REFERENCE TO RELATED APPLICATION

This application claims priority of German patent application no. 10 2020 132 800.1, filed Dec. 9, 2020, the entire content of which is incorporated herein by reference.

TECHNICAL FIELD

The present invention relates to an exhaust gas heating unit for an exhaust gas system of an internal combustion engine, by means of which, particularly in an initial phase of the operation of an internal combustion engine, at a comparatively low exhaust gas temperature or comparatively low temperature of the system regions arranged in the exhaust gas system for exhaust gas treatment, such as, for example, a catalytic converter unit or a particle filter unit, heat can be transferred to exhaust gas flowing in the exhaust gas system and thus also to system regions arranged downstream of such an exhaust gas heating unit. In the initial phase of the operation of an internal combustion engine, such an exhaust gas heating unit can shorten the period of time until a sufficiently high temperature of the system regions provided for exhaust gas treatment or for reducing the proportion of pollutants in the exhaust gas is reached, and can thus reduce pollutant emissions in the initial phase of the operation of an internal combustion engine.

BACKGROUND

An exhaust gas heating unit of this kind is known from US 2020/0300141. This exhaust gas heating unit comprises a jacket heating conductor having a substantially circular cross section and having a wire-type heating conductor element held in an electrically insulated manner in a jacket. Attached to the jacket, which is constructed with metal material, for example, is a heat transfer surface element constructed from bent flat strip material, which has a wave-like structure and is penetrated by the jacket heating conductor in wave surface regions lying between wave peaks of the wave-like structure and is attached to the jacket thereof for heat transfer. By providing the heat transfer surface element, which is constructed with a wave-like structure and which is arranged in the exhaust gas flow with its end faces substantially orthogonal to an exhaust gas primary flow direction and is arranged with its broad sides substantially parallel to the exhaust gas primary flow direction, a large surface area is provided for heat transfer. This surface area is further increased by the fact that the jacket heating conductor, with the heat transfer surface element attached to the jacket of the jacket heating conductor and constructed with a wave-like structure, has a spirally wound shape, with the result that a spiral structure is superimposed on the wave-like structure of the heat transfer surface element, the wave-like structure providing a substructure.

SUMMARY

It is an object of the present disclosure to provide an exhaust gas heating unit which has improved heat transfer capacity.

According to the invention, the above is achieved by an exhaust gas heating unit for an exhaust gas system of an internal combustion engine, comprising at least one electrically conductive heating conductor element. In the exhaust gas heating unit, the at least one electrically conductive heating conductor element, through which electric current flows in the heating mode, is constructed from bent flat strip material.

In the exhaust gas heating unit constructed according to the invention, the heating conductor element through which electric current flows is itself constructed from bent flat strip material and thus provides a large heat transfer surface, around which exhaust gas can flow directly in the heating mode. Such an embodiment avoids components which require additional heating, such as, for example, a jacket or the material which insulates such a jacket with respect to the heating conductor element, and thus has a significantly lower thermal inertia since the component around which exhaust gas flows and which thus comes into contact with the gas and through which electric current flows, that is, the heating conductor element, is itself configured with a geometry which provides a large surface area.

In order to obtain a large surface area which can be used or is intended for heat transfer, it is proposed that the at least one heating conductor element has broad sides, which are to be arranged substantially parallel to an exhaust gas primary flow direction, and end faces, which are to be arranged substantially orthogonal to the exhaust gas primary flow direction, and that a length of extent of the broad sides of the heating conductor element in a width direction is in the range of 10 mm to 20 mm, or/and a length of extent of the end faces of the heating conductor element in a thickness direction is in the range of 0.05 mm to 0.2 mm, or/and a ratio of the length of extent of the end faces of the heating conductor element in the thickness direction to the length of extent of the broad sides of the heating conductor element in the width direction is in the range of 0.002-0.025.

In order to heat the heating conductor element by applying an electric voltage, the flat strip material can be metal material or electrically conductive ceramic material. Furthermore, the heat transfer capacity can be further improved if the flat strip material provides an electrically non-insulated surface for exhaust gas to flow around. The at least one heating conductor element can be configured in longitudinal end regions for electrical connection to a voltage source.

In order to provide a large heat transfer surface, the at least one heating conductor element can furthermore be configured with a wave-like structure. It should be noted that in the context of the present invention, a wave-like structure can be provided, for example, by an approximately sinusoidal, zigzag, sawtooth or a similarly formed shape with curvature-like or edge-like wave peaks and wave surface regions lying between them, extending approximately rectilinearly, for example, parallel to one another or running in a curved manner, at least in some region or regions. A shape of this kind, which provides a wave-like structure, can provide a periodically repeating wave pattern, but can also have a wave pattern with a wavelength which changes at least in various regions of the at least one heating conductor element, that is, a spacing between wave peaks which changes. This wave-like structure of the at least one heating conductor element can form a substructure, on which a larger or higher-level structure of the heating conductor element, for example a spiral structure or meandering structure explained below, can be superimposed.

In particular, if the at least one heating conductor element has an electrically conductive surface which is exposed to the outside, but the cross section through which the exhaust gas can flow is nevertheless to be covered very efficiently with the heating conductor element, it is advantageous, in order to avoid a short circuit, if the at least one heating conductor element comprises heating conductor element length regions which run adjacent to one another and are arranged in an electrically insulated manner with respect to one another.

For example, very efficient use of the available cross section through which exhaust gas can flow can be achieved in that the at least one heating conductor element is arranged in a spiral shape, and in that the heating conductor element length regions which run adjacent to one another are provided by winding sections which run radially adjacent to one another with respect to a spiral center.

In an alternative embodiment, it is possible for this purpose to provide for the at least one heating conductor element to be arranged in a meandering shape, and for the heating conductor element length regions which run adjacent to one another to be provided by meander sections which run next to one another and are connected to one another in transitional regions.

The electrical insulation can be provided in a manner which is simple to implement but nevertheless efficient in that the heating conductor element length regions which run adjacent to one another are electrically insulated with respect to one another by maintaining an interspace between them, or/and that the heating conductor element length regions which run adjacent to one another are electrically insulated with respect to one another by arranging electrically insulating, preferably flat-strip-type material between them.

According to a further embodiment according to the invention, an efficient transfer of heat to exhaust gas to be heated can be achieved in that a plurality of heating conductor elements, which are constructed from bent flat strip material and are arranged in an electrically insulated manner with respect to one another, is provided.

In this case, at least some of the heating conductor elements can be connected electrically in parallel with one another.

Even with the use of a plurality of heating conductor elements which are, for example, connected electrically in parallel with one another, they can be arranged adjacent to one another in a spiral shape, starting from a spiral center, with the result that the heating conductor elements provide mutually adjacent spiral arms.

In an alternative arrangement, the heating conductor elements can provide heating conductor element length regions which are elongated substantially in a straight line and run next to one another.

In order to avoid an electrical short circuit between the individual heating conductor elements, it is proposed that the heating conductor elements be electrically insulated with respect to one another by maintaining an interspace between them, or/and that the heating conductor elements be electrically insulated with respect to one another by arranging electrically insulating, preferably flat-strip-type material between them. It should be noted in this context that, of course, where the heating conductor elements are configured for connection to a voltage source, they can be electrically conductively connected to one another, for example, by parallel connection or serial connection. In the length regions located between the regions provided for electrical contacting, for example the respective longitudinal end regions of the heating conductor elements, these are then electrically insulated with respect to one another, for example, by the measures described above, in order to avoid a short circuit in length regions located between the connection regions.

For defined positioning in the exhaust gas flow, a support structure, which supports the at least one heating conductor element in a predefined position, can be provided.

For this purpose, for example, the support structure can comprise at least one support element having positioning projections which engage between peak regions of the wave-like structure of the at least one heating conductor element, or/and the support structure can comprise at least one support element having positioning recesses which receive peak regions of the wave-like structure of the at least one heating conductor element, or/and the support structure can comprise at least one support element which engages in positioning recesses in peak regions of the at least one heating conductor element.

Alternatively or additionally, provision can be made for the support structure to comprise at least one support element, which is held on wave surface sections which run between wave peaks of the wave-like structure of the at least one heating conductor element, in order to specify or maintain defined positioning.

In this case, at least one support element can pass through the wave surface sections. As an alternative or in addition, at least one support element can be supported on an end face of the at least one heating conductor element in the region of the wave surface sections.

Furthermore, in order to support defined positioning, the support structure can comprise at least one support element, which is arranged on an end face of the at least one heating conductor element and has a plurality of support arms, which are preferably arranged in a star-like configuration. Support elements of this kind are preferably arranged both on the inflow side and on the outflow side of the at least one heating conductor element.

For a compact configuration which is simple to implement in terms of construction, the support structure can comprise the electrically insulating material.

For greater efficiency in reducing the pollutant emissions of an internal combustion engine, it is proposed that the at least one heating conductor element is coated, at least in some region or regions, with catalytically active material. On the one hand, by providing such catalytically active material on the at least one heating conductor element, its surface in the exhaust gas flow is additionally used to carry out a catalytic reaction which contributes to reducing pollutant emissions. On the other hand, this catalytically active material, which is provided on the at least one heating conductor element, is already heated in the starting phase of the operation of an internal combustion engine, when the at least one heating conductor element is electrically excited, by virtue of the fact that the catalytically active material is provided directly on the heating element through which current flows, thus enabling the catalytic reaction provided by this material to start immediately after the start of the excitation of the at least one heating conductor element, that is, after the application of an electrical voltage to the latter, and already enabling a contribution to be made in the exhaust gas heating unit to the reduction of pollutant emissions, even in an operating phase in which an exhaust gas treatment unit which follows on in the exhaust gas flow has not yet reached the temperature required for carrying out a catalytic reaction.

For this purpose, provision can be made, for example, for the catalytically active material, preferably containing platinum or/and palladium or/and rhodium, to provide a three-way catalyst function, or/and for the catalytically active material, preferably containing titanium oxide or/and zirconium oxide or/and aluminum oxide, to provide a hydrolysis catalyst function, or/and for the catalytically active material, preferably containing platinum or/and palladium or/and barium, to provide a nitrogen oxide storage catalyst function, or/and for the catalytically active material, preferably containing platinum or/and palladium, to provide a diesel oxidation catalyst function, or/and for the catalytically active material, preferably containing iron zeolite or/and copper zeolite or/and vanadium oxide, to provide an SCR catalyst function.

The invention furthermore relates to an exhaust gas system for an internal combustion engine, comprising at least one exhaust gas heating unit constructed according to the invention.

In order to be able to efficiently utilize the heat introduced by the exhaust gas heating unit into exhaust gas flowing around the latter, it is proposed that the at least one exhaust gas heating unit is arranged upstream with respect to at least one exhaust gas treatment unit, preferably a catalytic converter unit or/and a particle filter unit.

In order to be able to use the comparatively large heat transfer surface area provided by the at least one heating conductor element of an exhaust gas heating unit constructed in accordance with the invention efficiently for heat transfer, with the lowest possible flow resistance, it is proposed that the at least one heating conductor element of the at least one exhaust gas heating unit is arranged substantially parallel to an exhaust gas primary flow direction with broad sides which extend in a width direction, and is arranged substantially orthogonal to the exhaust gas primary flow direction with end faces which extend in a thickness direction.

BRIEF DESCRIPTION OF THE DRAWINGS

The invention will now be described with reference to the drawings wherein.

DESCRIPTION OF THE PREFERRED EMBODIMENTS

Figure 1:
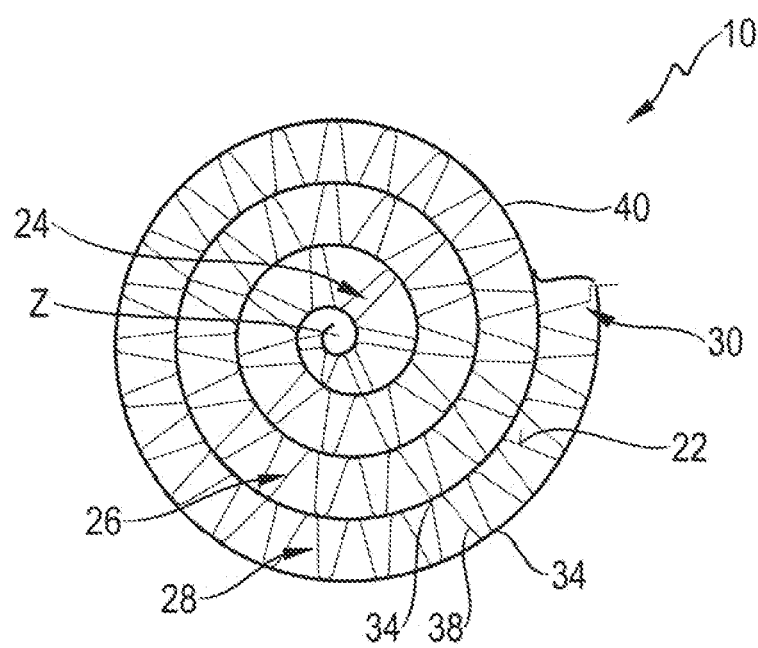
FIG. 1 shows a plan view of an exhaust gas heating unit having a heating conductor element constructed from flat strip material.
Figure 2:
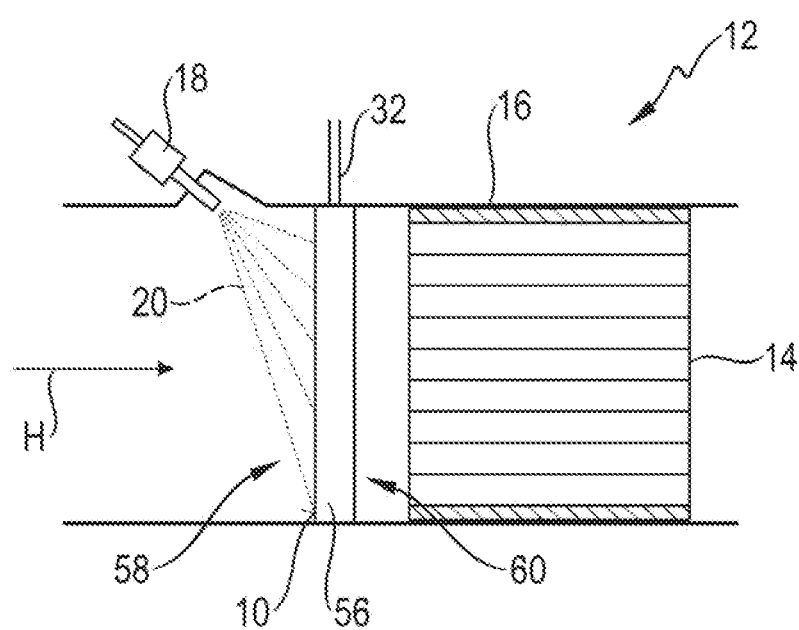
FIG. 2 shows a section of an exhaust gas system for an internal combustion engine with an exhaust gas heating unit according to FIG. 1.

FIG. 1 shows a plan view of an exhaust gas heating unit designated generally by 10, which can be arranged in an exhaust gas system 12, a segment of which is illustrated in FIG. 2, of an internal combustion engine at a point upstream with respect to an exhaust gas treatment unit 14 configured, for example, as a catalytic converter unit or as a particle filter unit. Like the exhaust gas treatment unit 14, the exhaust gas heating unit 10 can be supported in the exhaust gas system 12 on an exhaust-gas-carrying component 16, which is configured, for example, in the form of a tube or housing, in such a way that the exhaust gas flowing toward the exhaust gas treatment unit 14 in the exhaust-gas-carrying component 16 in an exhaust gas primary flow direction H first flows through the exhaust gas heating unit 10 and, in the heating mode of the exhaust gas heating unit 10, absorbs heat there, which the exhaust gas then inputs into the exhaust gas treatment unit 14.

In the embodiment illustrated in FIG. 2, the exhaust gas treatment unit 14 is constructed as an SCR catalytic converter unit, and an injector 18 is provided upstream with respect to the latter and also with respect to the exhaust gas heating unit 10, by means of which injector a reactant 20, for example a urea/water solution, is introduced into the exhaust gas flow and, in particular also, toward the exhaust gas heating unit 10.

During the operation of an internal combustion engine, the exhaust gas heating unit 10 is put into operation at least in a starting phase of this operation in order to heat the still comparatively cold exhaust gas emitted by the internal combustion engine before it flows through the exhaust gas treatment unit 14. The exhaust gas thereby inputs heat into the exhaust gas treatment unit 14, with the result that the latter is also heated comparatively quickly at the start of the operation of an internal combustion engine and reaches a temperature which is necessary for carrying out the catalytic reaction provided therein. Since, in the embodiment illustrated in FIG. 2, the reactant is also introduced into the exhaust gas flow upstream of the exhaust gas heating unit 10, for example directly toward the exhaust gas heating unit 10, this reactant 20 is also heated at the exhaust gas heating unit 10 at a still comparatively low exhaust gas temperature and is thus evaporated to a greater extent, thus assisting the thorough mixing of exhaust gas and reactant 20 upstream of the exhaust gas treatment unit 14.

Alternatively, the injector 18 can also be provided for the purpose of introducing fuel, that is, hydrocarbon, into the exhaust gas flow upstream of the exhaust gas heating unit 10. Hydrocarbons are converted at the surface of the exhaust gas heating unit 10, which is heated in heating mode, wherein additional heat of reaction is released and thus the heating power provided in the region of the exhaust gas heating unit 10 can be increased even further. The injection of fuel, that is, hydrocarbon, can of course also take place in conjunction with an exhaust gas treatment unit 14 configured as an SCR catalytic converter unit in order to be able to bring the latter to operating temperature as quickly as possible.

The exhaust gas heating unit 10 illustrated in FIG. 1 comprises a heating conductor element 22 constructed from bent flat strip material. The heating conductor element 22 is configured to provide a large surface area around which exhaust gas can flow and which has a wave-like or meandering structure and has a spiral shape superimposed on this wave-like structure. Radially adjacent heating conductor element length regions 26, 28 provided by individual winding sections of the spiral shape are thus obtained. In a longitudinal end region 24 close to a spiral center Z and in a longitudinal end region 30 providing an outer end of the spiral shape, the electrically conductive heating conductor element 22 is configured with respective connections or line regions for electrical connection to a voltage source arranged outside the exhaust gas flow. For this purpose, as indicated in FIG. 2, a lead-through 32 for such electrical connecting lines can be provided on the exhaust-gas-carrying component 16 which accommodates the exhaust gas heating unit 10 and which can likewise provide a housing for the exhaust gas heating unit 10.

Because of the wave-like structure of the heating conductor element 22, the latter has, between its longitudinal end regions 24, 30, a multiplicity of wave peaks 34 which follow one another in the longitudinal direction of the heating conductor element 22 and which can be formed, for example, by curved regions or edge regions. Between in each case two such wave peaks 34 there is a wave surface region 38, in which, in its course between the two wave peaks 34 enclosing the region, the heating conductor element 22 can extend, for example approximately rectilinearly, or can also be curved, at least in some region or regions.

The heating conductor element 22, which itself is flowed through by electric current owing to the application of an electric voltage, can be constructed with metal material, for example an Fe/Cr/Al alloy or stainless steel with an aluminum content of more than 2%, and can thus provide a high-temperature heating conductor. It is also possible to construct the heating conductor element 22 from electrically conductive ceramic material.

In order to keep the mutually adjacent heating conductor element length regions 26, 28 electrically insulated from one another and thus to avoid a short circuit in regions between the longitudinal end regions 24, 30 provided for electrical contacting, electrically insulating material 40 can be arranged between the mutually adjacent heating conductor element length regions 26, 28. This can also be constructed from flat strip material, for example thermally resistant plastics material or electrically insulating ceramic material, and is matched to the spiral shape of the heating conductor element 22, which is provided with a wave-like structure.

Figure 11:
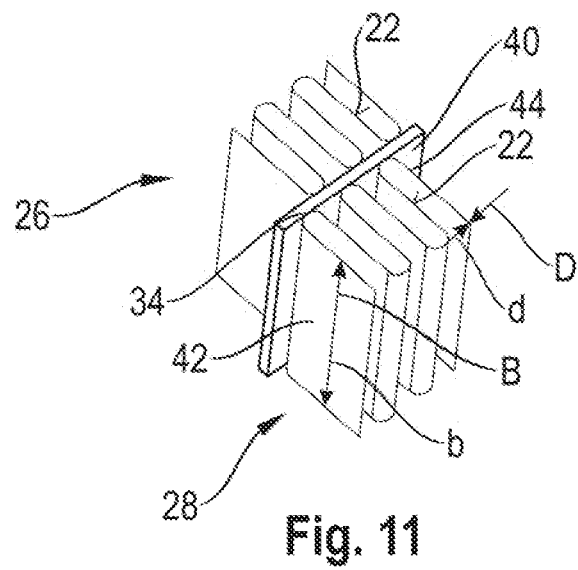
FIG. 11 shows two heating conductor element length regions separated from one another by electrically insulating material.

As FIG. 11 illustrates, the heating conductor element 22 rests by means of its heating conductor element length regions 26, 28 against the electrically insulating material 40 in the region of the wave peaks 34, thus ensuring that mutual contact between the mutually adjacent heating conductor length regions 26, 28 cannot occur.

It can also be seen in FIG. 11 that the heating conductor element 22, which is constructed from a flat strip material and brought into its wave-like shape by bending of the flat strip material, has a significantly greater length of extent b on broad sides 42 thereof, which are elongated in a width direction B corresponding substantially to the exhaust gas primary flow direction H, than on end faces 44, which are oriented substantially orthogonally with respect to the exhaust gas primary flow direction H. For example, the heating conductor element 22 can be configured with a length of extent d of the end faces 44 in the thickness direction D in the range of 0.05 mm to 0.2 mm, while a length of extent b of the broad sides 42 in the width direction B can be in the range of 10 mm to 20 mm. The ratio of the length of extent d in the thickness direction D to the length of extent b in the width direction B is advantageously in the range of 0.002 to 0.025. The mutual spacing of directly adjacent wave peaks can be in the range of 1 to 4 mm, for example.

Figure 10:
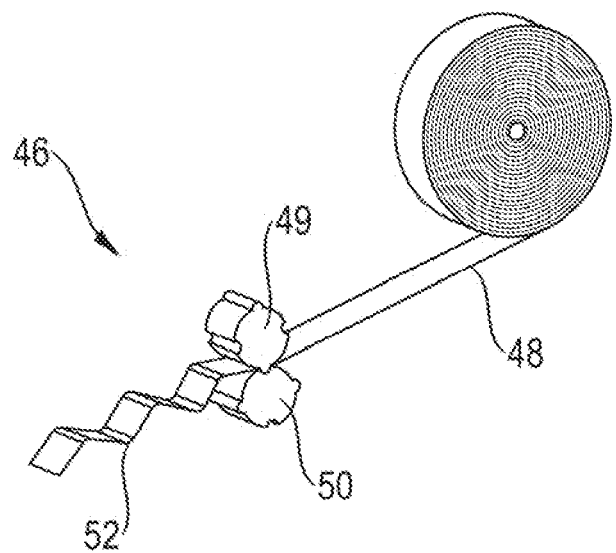
FIG. 10 shows an illustration depicting the production of a heating conductor element from flat strip material.

A heating conductor element 22 of this type constructed with flat strip material can be produced, for example, with a device 46 that is illustrated schematically in FIG. 10 and has two forming rollers 49, 50 that receive the flat strip material 48 between them. As it passes through these forming rollers 49, 50, deformation regions 52 are formed in the flat strip material 48, with the result that, depending on the intended radius of curvature, the wave peaks 34 either remain as arcuate curvature regions or, in the case of sharp-edged deformation, as edge regions. Through the deformation of the flat strip material 48, it is thus possible to specify the characteristic of the wave-like structure, for example, as a zigzag structure or as a more or less sinusoidal structure. After the formation of the deformation regions 52, the flat strip material 48 is compressed, with the result that the wave surface regions 38 lying between the deformation regions 52 or the wave peaks 34 provided by them run approximately parallel to one another, and thus the wave-like meandering structure of the heating conductor element 22 is obtained.

Since, when a heating conductor element 22 constructed in this way is integrated into an exhaust gas system 12, the component through which current flows, that is, the heating conductor element 22, is flowed around directly by the exhaust gas flow which is to be heated, efficient heat transfer into the exhaust gas flow is ensured, the heating conductor element 22 providing a large surface area for the transfer of heat to the exhaust gas flow on account of its formation from flat strip material. Since, furthermore, the heating conductor element 22 is integrated into the exhaust gas flow in such a way that its end faces 44 are oriented substantially orthogonally with respect to the exhaust gas primary flow direction H, and thus the broad sides 42 run substantially parallel to the exhaust gas primary flow direction H, the heating conductor element 22 offers only a comparatively low flow resistance, despite the large surface area thereof which is available for heat transfer. Also contributing to this is that the electrically insulating material 40 is likewise provided as flat strip material and is oriented with its end faces orthogonal with respect to the exhaust gas primary flow direction.

In an alternative embodiment for electrical insulation, instead of the electrically insulating material 40, a slot-type interspace through which exhaust gas can flow can remain between the mutually adjacent heating conductor element length regions, thus enabling the flow resistance to be reduced even further. Such a spacing can be in the range of 1 to 2 mm, for example. Likewise, the spacing between mutually adjacent wave surface regions 38 can be in the range of 1 to 2 mm, thus ensuring that the occurrence of an electrical short circuit within a respective heating conductor element length region is also avoided.

Figure 3:
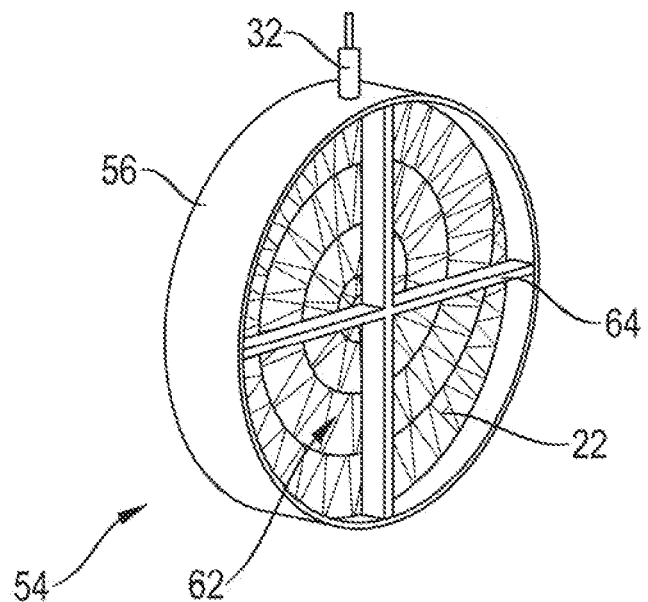
FIG. 3 shows a perspective view of an exhaust gas heating unit according to FIG. 1 arranged in a support structure.

FIG. 3 shows the integration of the heating conductor element 22 into a support structure 54 which holds or supports it in a defined position. In order to avoid an electrical short circuit, this is constructed or coated with electrically insulating material. The support structure 54 comprises a tubular or cylindrical housing 56 which externally surrounds the spirally wound heating conductor element 52. The housing 56, together with the heating conductor element 22 arranged therein, can be integrated into the exhaust-gas-carrying component 16 of the exhaust gas system 12 or can be provided by the exhaust-gas-carrying component 16 itself. On at least one, preferably both, sides of the heating conductor element 22, as viewed in the exhaust gas primary flow direction H, that is, both the inflow side 58 and the outflow side 60, the support structure 54 comprises a support element 62, which is configured with a star-like or cross-like configuration and has a plurality of support arms 64 which adjoin one another radially on the inside with respect to a longitudinal central axis of the housing 56. In the radially outer region, these are firmly attached to the housing 56. Between the support elements 62 arranged on the inflow side 58 and the outflow side 60, the heating conductor element 22 is held in a defined position with its heating conductor length regions 26, 28, which are kept electrically insulated with respect to one another, for example, by the electrically insulating material 40. Since the support arms 64 of the support element 62 or support elements 62 are also arranged in such a way that their end faces or narrow sides are oriented orthogonally with respect to the exhaust gas primary flow direction H, these too introduce only a low flow resistance.

Figure 4:
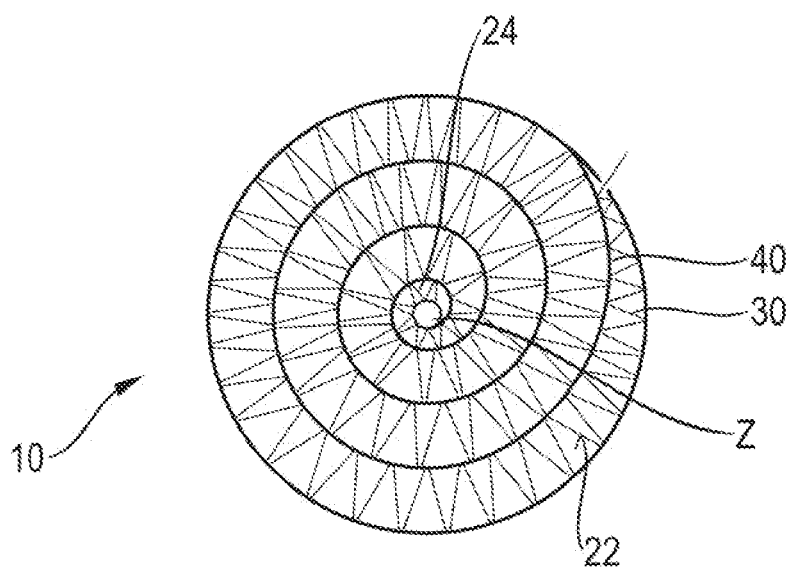
FIG. 4 shows an illustration corresponding to FIG. 1 of an alternatively constructed exhaust gas heating unit.

FIG. 4 shows a modification of the embodiment illustrated in FIG. 1, in which the wave height decreases in the direction of the longitudinal end region 30, with the result that the heating conductor element 22, which has been brought into the spirally wound shape and fundamentally has a wave structure, presents overall an approximately circular outer circumferential contour and thus, when it is integrated into the, for example, likewise circular housing 56 or the exhaust-gas-carrying component 16, there are substantially no remaining regions of the flow cross section in which there is no thermal interaction between the exhaust gas and the heating conductor element 22. In order to achieve complete electrical insulation with respect to the outside, the electrically insulating material 40 completely covers the exhaust gas heating element 22 in its longitudinal end region 30, and therefore a completely closed ring of the electrically insulating material 40 is formed at the outer circumference. As already explained above, electrical contacting of the heating conductor element 22 takes place in the longitudinal end regions 24, 30, it being possible, for example, for the negative pole to be located in longitudinal end region 24 and for the positive pole to be located in longitudinal end region 30.

Figure 5:
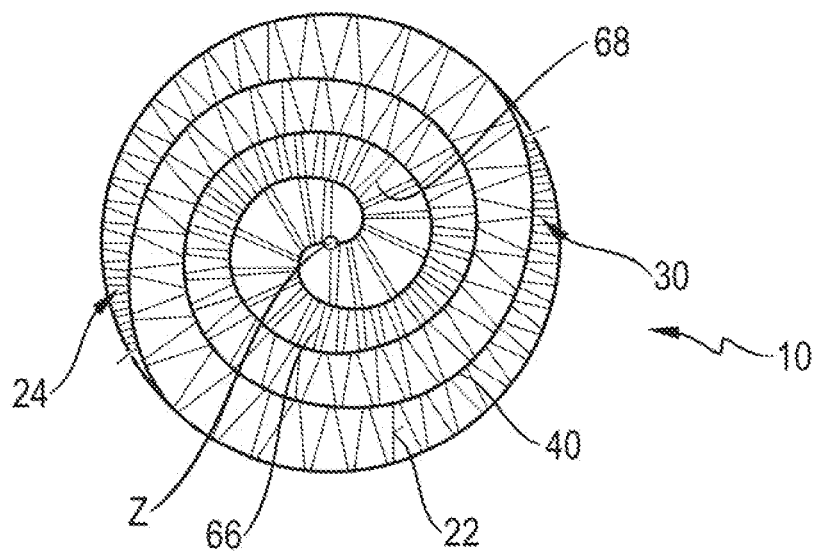
FIG. 5 shows a further illustration corresponding to FIG. 1 of an alternatively constructed exhaust gas heating unit.

FIG. 5 shows a structure in which, fundamentally, the heating conductor element 22 extending between the longitudinal end regions 24, 30 also has a spirally wound shape but, starting from the spiral center Z, forms two mutually surrounding spiral arms 66, 68. Between these runs the electrically insulating material already explained above.

In both now radially outer longitudinal end regions 24, 30, the heating conductor element 22 can again have a decreasing wave height, and therefore it is possible once again to achieve the approximately circular or elliptical cross section with which the heating conductor element 22 can be matched to the cross sectional geometry of the housing 56 of the exhaust-gas-carrying component 16. Since no electrical contacting is required in the region of the spiral center Z, it is also not necessary to pass an electrical line which provides this contacting through the exhaust gas flow radially inward to the spiral center Z.

In the above-described embodiments of a heating conductor element, a single heating conductor element 22 covers the entire cross section through which exhaust gas can flow. This has the effect that, owing to the comparatively long length of the heating conductor element, which is also provided with a wave-like structure, the element provides a comparatively high electrical resistance.

If high heating capacities are required, it is therefore advantageous, in the case of such a configuration, to configure the heating conductor element 22 with a comparatively long length of extent d in the thickness direction D of, for example, about 0.2 mm.

Figure 6:
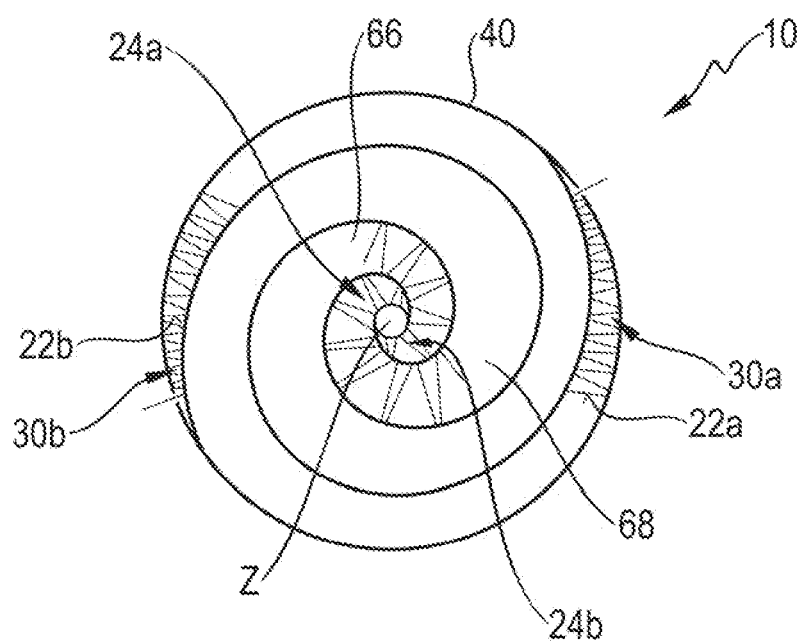
FIG. 6 shows a further illustration corresponding to FIG. 1 of an alternatively constructed exhaust gas heating unit having two heating conductor elements constructed with flat strip material.

Since such a comparatively great thickness of the heating conductor element 22 also leads to a greater thermal inertia, which is to be avoided per se, a structure having two heating conductor elements 22a, 22b, each providing one spiral arm 66, 68, can be provided in the embodiment illustrated in FIG. 6. In comparison with the structure in FIG. 5, each of the two heating conductor elements 22a, 22b has only half the length between a respective radially inner longitudinal end region 24a, 24b and a respective radially outer longitudinal end region 30a, 30b. Thus, between the radially inner contact point and the radially outer contact point, each of the two heating conductor elements 22a, 22b sets up half the electrical resistance of the embodiment illustrated in FIG. 5, and therefore, with an equally large surface area available for heat transfer, a comparatively low electrical resistance is achieved in each of the heating conductor elements 22a, 22b and thus large heating capacities can also be obtained.

Figure 7:
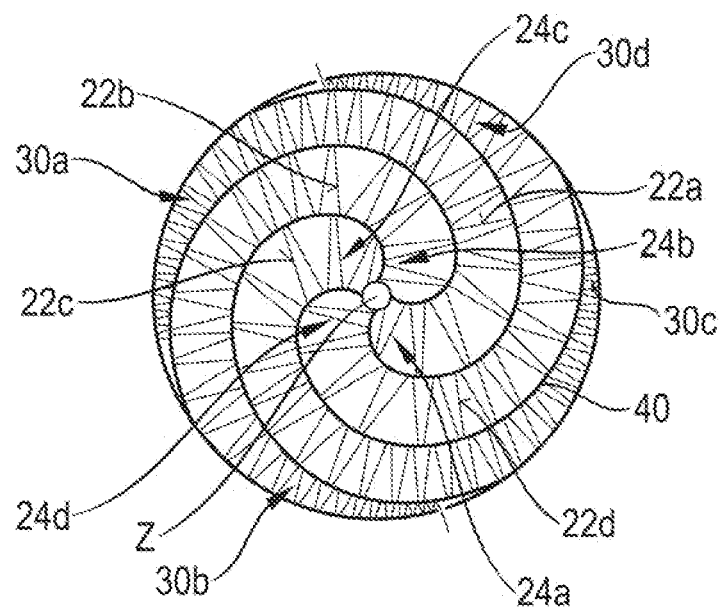
FIG. 7 shows a modification of the embodiment shown in FIG. 6 having four heating conductor elements constructed with flat strip material.

As a further development of this embodiment, FIG. 7 shows a structure in which a total of four heating conductor elements 22a, 22b, 22c, 22d are arranged so as to surround one another or adjoin one another and are separated from one another by electrically insulating material 40. Each of the heating conductor elements 22a, 22b, 22c, 22d has an even shorter length of extent between the respective radially inner longitudinal end region 24a, 24b, 24c, 24d and the respective radially outer longitudinal end region 30a, 30b, 30c, 30d and thus an even lower electrical resistance. In this embodiment too, electrical contacting takes place, on the one hand, in the region of the spiral center Z in the radially inner longitudinal end regions 24a, 24b, 24c, 24d and, on the other hand, in the radially outer longitudinal end regions 30a, 30b, 30c, 30d. Particularly for contacting radially on the outside, it is possible if, as shown in FIGS. 6 and 7, a plurality of heating conductor elements is provided, for the respective radially outer longitudinal end regions 30a, 30b, 30c, 30d to be connected to a contacting ring and thus connected jointly to a voltage source.

It should be noted that it is also possible to provide other, in particular also uneven, numbers of heating conductor elements, for example, with the spirally intertwined structure illustrated in FIGS. 6 and 7.

Figure 8:
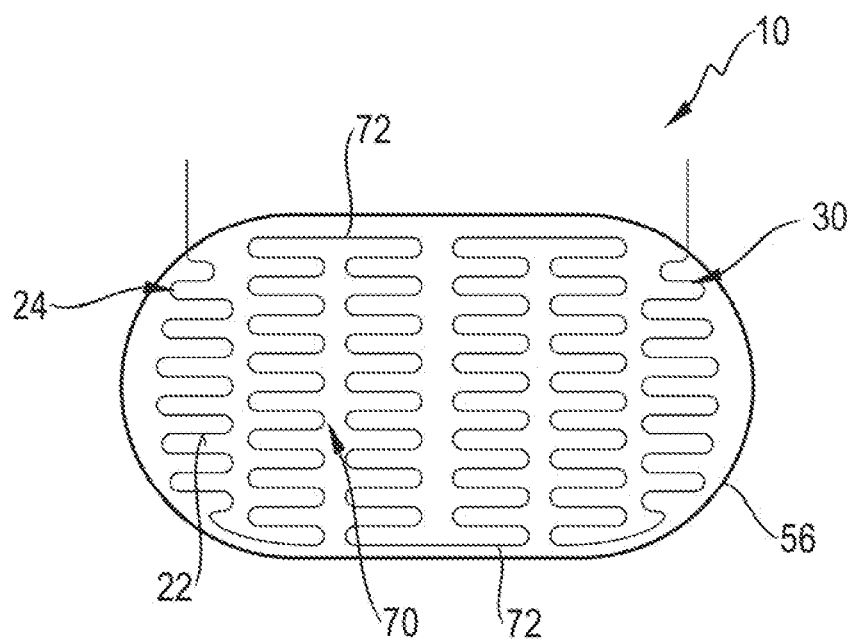
FIG. 8 shows an alternative embodiment of an exhaust gas heating unit having a heating conductor element which is configured with a wave-like structure and is arranged in a meandering shape.

A further configuration variant is shown in FIG. 8. This shows a heating conductor element 22 which is configured with a wave-like structure and has a meandering shape between its two longitudinal end regions 24, 30 provided for electrical contacting. The heating conductor element 22 has a plurality of heating conductor element length regions 70 which extend substantially in a straight line but are constructed with the wave-like structure, the regions being connected to one another in respective transitional regions 72. With such an embodiment, adaptation to the flow cross section of a housing 56 accommodating the heating conductor element 22, the housing being provided, for example, by the exhaust-gas-carrying component 16 which also comprises the exhaust gas treatment unit 14, can be achieved, especially if this flow cross section is not circular but, for example, elliptical or oval. In this embodiment too, immediately adjacent heating conductor length regions 70 can be separated from one another by electrically insulating material or by a slot-like interspace, which can be seen in FIG. 8.

Figure 9:
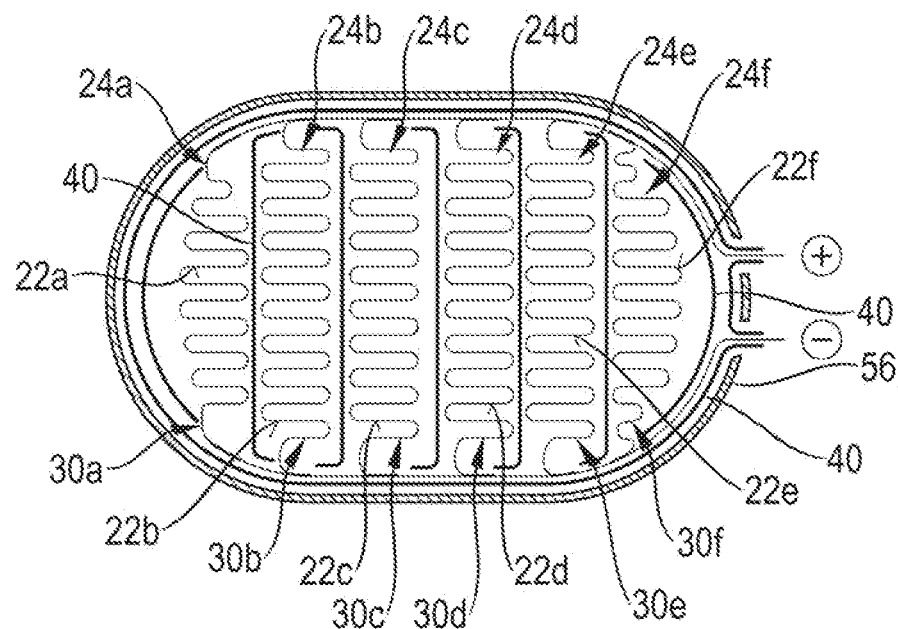
FIG. 9 shows an exhaust gas heating unit having a plurality of mutually adjacent, substantially rectilinearly extending heating conductor elements with a wave-like structure.

In order fundamentally to provide a lower electrical resistance even in the case of such an embodiment, the aim being to obtain higher heating capacities, a plurality of heating conductor elements 22a, 22b, 22c, 22d, 22e, 22f can be arranged next to one another in the housing 56 in the case of the embodiment illustrated in FIG. 9. The longitudinal end regions 24a, 24b, 24c, 24d, 24e, 24f can be electrically conductively connected to one another and can be connected, for example, to the positive pole of a voltage source. Likewise, the longitudinal end regions 30a, 30b, 30c, 30d, 30e, 30f can be electrically conductively connected to one another and, for example, to a negative pole of a voltage source, with the result that the total of six heating conductor elements 22a, 22b, 22c, 22d, 22e, 22f are connected in parallel with one another and each of these heating conductor elements presents a comparatively low electrical resistance. In this embodiment too, the immediately adjacent heating conductor elements 22a, 22b, 22c, 22d, 22e, 22f can be separated from one another by electrically insulating material 40 or by a slot-like interspace. Likewise, the heating conductor elements 22a, 22b, 22c, 22d, 22e, 22f can be surrounded by such electrically insulating material in the region adjoining the housing 56.

Figure 12:
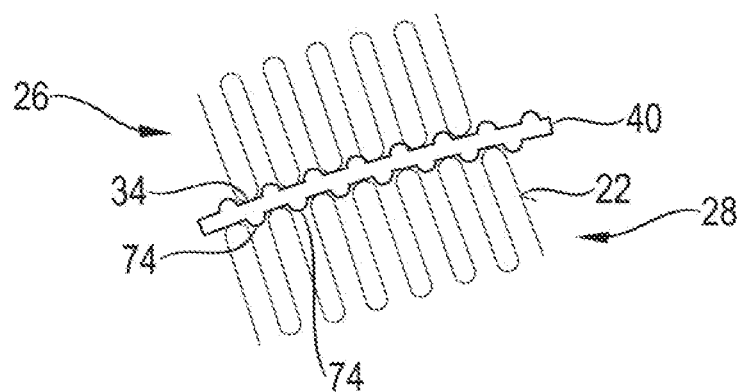
FIG. 12 shows an illustration corresponding to FIG. 11 of two heating conductor element length regions separated from one another by electrically insulating material, wherein the electrically insulating material forms part of a support structure.
Figure 13:
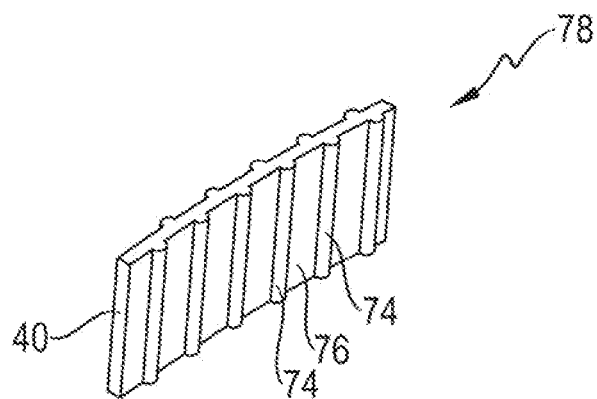
FIG. 13 shows a perspective view of a portion of the electrically insulating material of FIG. 12.

FIGS. 12 and 13 show an embodiment of the electrically insulating material 40 arranged between two heating conductor element length regions, for example the heating conductor element length regions 26, 28 of the heating conductor element 22 illustrated in FIG. 1. It is pointed out that it is also possible in the other embodiments described above for such an electrically insulating material 40 to be arranged between two heating conductor element length regions or two heating conductor elements arranged adjacent to one another.

It can be seen that, in association with the wave peaks 34 of the heating conductor element length regions 26, 28 arranged adjacent to one another, this electrically insulating material 40, provided for example as flat strip material, has positioning projections 74 engaging between adjacent wave peaks 34 or has a positioning recess 76 between each two such positioning projections 74. By means of the positioning projections 74 engaging between each two adjacent wave peaks 34 of the same heating conductor element length region 26, 28, or by means of the positioning recesses 76 receiving the wave peaks 34, defined positioning of the wave peaks and thus of the heating conductor element length regions 26, 28 is ensured, and therefore an electrically insulating material 40 constructed in this way can provide a support element 78 of the support structure 54.

Figure 14:
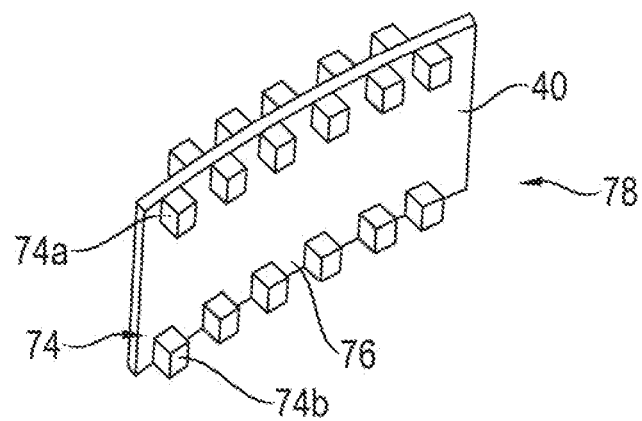
FIG. 14 shows a perspective view of a portion of electrically insulating material to be arranged between heating conductor element length regions or heating conductor elements, which also forms part of a support structure.

While, in the embodiment illustrated in FIG. 13, the positioning projections 74 are configured to be completely continuous in the width direction of the electrically insulating material 40, in the embodiment illustrated in FIG. 14 each of the positioning projections 74 is provided with two sections 74a, 74b which are separated from one another in the width direction of the electrically insulating material 40. This is advantageous, particularly on account of the reduction in the pressure loss and thus for a low flow resistance. Furthermore, as a result, only a small proportion of the surface area of a respective heating conductor element 22 which can be used for heat transfer is covered by the positioning projections 74.

Figure 15:
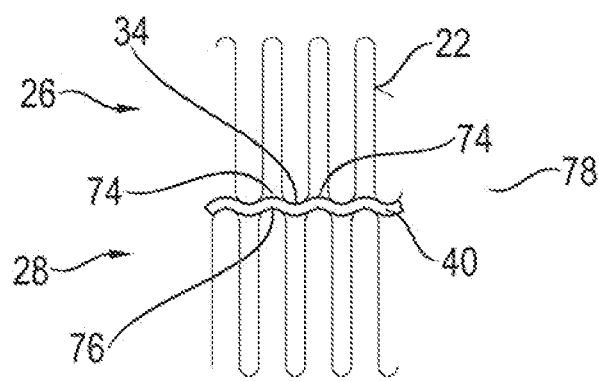
FIG. 15 shows two heating conductor element length regions with electrically insulating material arranged between them, which forms part of a support structure.

A further alternative embodiment of an electrically insulating material 40 provided for defined positioning of a heating conductor element 22 and providing a support element 78 is illustrated in FIG. 15. In this embodiment, the electrically insulating material 40 itself has a wave-like structure and thus provides with its wave peaks respective positioning projections 74 and with its regions lying between two wave peaks positioning recesses 76 in which the wave peaks 34 of the heating conductor element 22 or of the heating conductor element length regions 26, 28 can be received.

Figure 16:
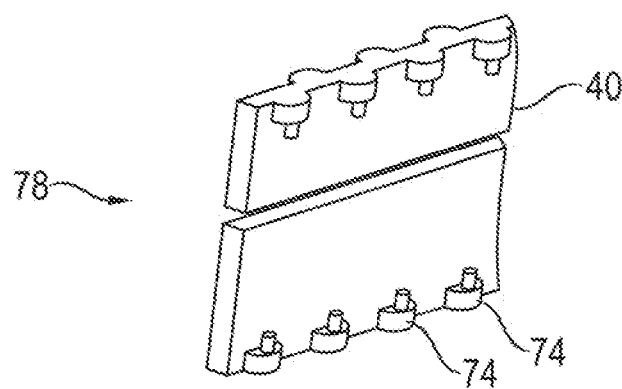
FIG. 16 shows an alternative embodiment corresponding to FIG. 14 of an electrically insulating material forming part of a support structure.
Figure 17:
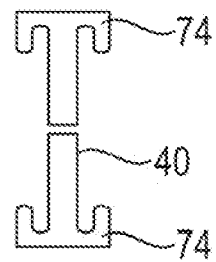
FIG. 17 shows a transverse view of the electrically insulating material of FIG. 16.

A further alternative configuration is illustrated in FIGS. 16 and 17. Here, the electrically insulating material 40 is formed at its two end faces with hook-like positioning projections 74 which fit over and behind a heating conductor element or heating conductor element length regions thereof at the end faces in the region of the wave peaks and thus hold it in a defined position.

Figure 18:
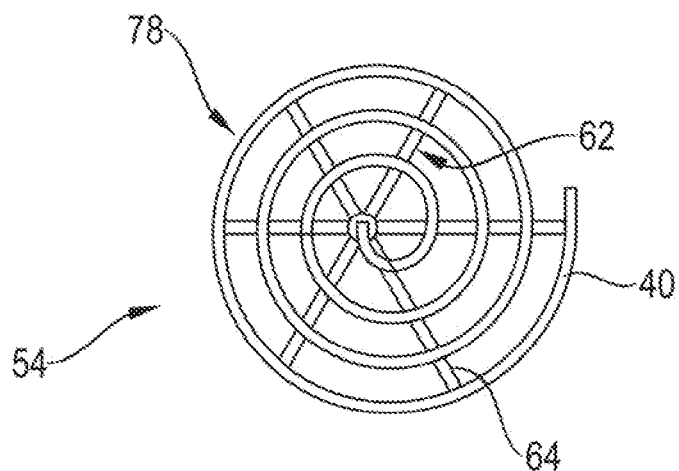
FIG. 18 shows an end view of a support structure for a spiral heating conductor element.

FIG. 18 shows a support structure 54 which, on the one hand, comprises an electrically insulating material configured for a spiral shape of a heating conductor element and providing a support element 78, which can be configured as illustrated in FIGS. 12 to 17, for example, and thus not only ensures the electrical insulation of heating conductor element length regions or heating conductor elements running next to one another but also specifies a defined positioning for the wave peaks of the same. Furthermore, the support structure 54 comprises the support elements 62, which are of cross- or star-like configuration, with the support arms 64 preferably both on the inflow side and on the outflow side. Where the support arms 64 cross or intersect the electrically insulating material 40, they can be connected to one another in order thus to define a cage-like structure which accommodates one or more heating conductor elements in a defined position. For example, all the components of this cage-like structure may be constructed from electrically insulating ceramic material, and the cage-like structure may be provided as a molded part at least comprising the electrically insulating material 40 and one of the support elements 62.

Figure 19:
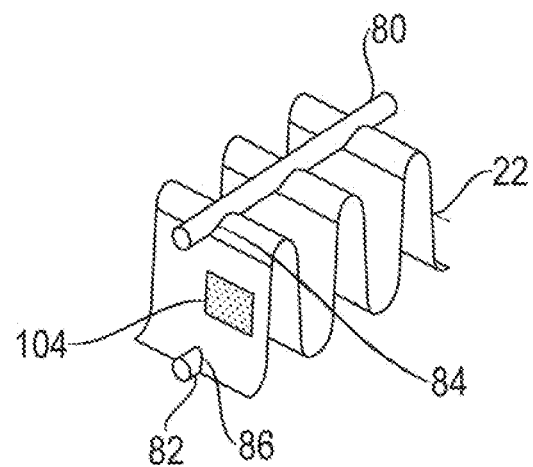
FIG. 19 shows a section of a heating conductor element with a wave-like structure and, in the region of wave peaks, support elements interacting with the element.
Figure 20:
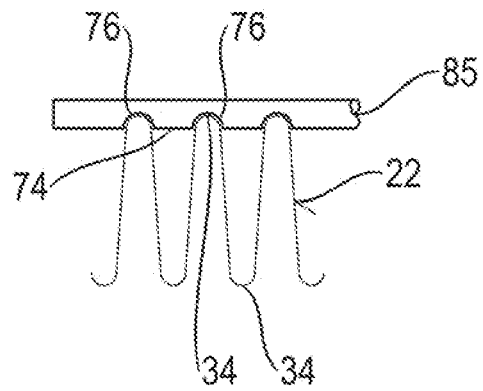
FIG. 20 shows a side view of a modification of the arrangement illustrated in FIG. 19.
Figure 21:
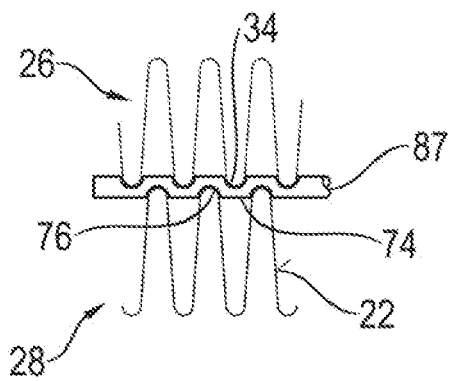
FIG. 21 shows a modification of the embodiment illustrated in FIG. 19.

Further alternative configurations for specifying a defined positioning or also an electrical insulation for a heating conductor element 22 are illustrated in FIGS. 19 to 21. In the region of the wave peaks 34, the heating conductor element 22 illustrated in FIG. 19 has recesses 84, 86, in which a respective support element 80, 82 is positioned so as to engage. In this way, a defined positioning of adjacent wave peaks 34 with respect to one another can also be predetermined, for example, also by frictional interaction, and the wave peaks 34 of mutually adjacent heating conductor element length regions can be kept separate from one another. In order to avoid an electrical short circuit, the support elements 80, 82 are constructed from electrically insulating material, for example, ceramic material or thermally resistant plastics material.

In the modification illustrated in FIG. 20, such a web- or rod-like support element 85 is constructed with positioning recesses 76 receiving respective wave peaks 34 of the heating conductor element 22 and with positioning projections 74 lying therebetween, thus assisting with the defined positioning of the wave peaks 34 with respect to one another.

FIG. 21 shows an embodiment in which such a support element 87, in association with heating conductor element length regions 26, 28 arranged adjacent to one another, in each case provides positioning recesses 76 and positioning projections 74 lying therebetween.

Figure 22:
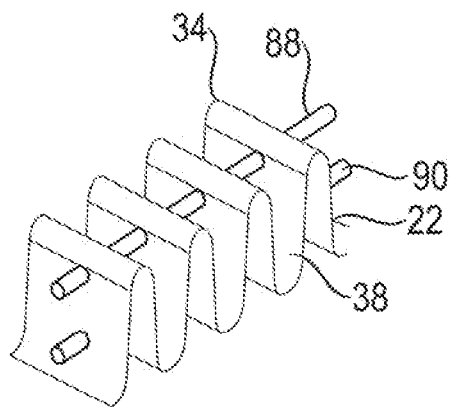
FIG. 22 shows a heating conductor element configured with a wave-like structure having support elements of a support structure which pass through wave surface regions of the element.

FIG. 22 shows an embodiment in which two such web-like or rod-like support elements 88, 90 pass through the wave surface regions 38 of the heating conductor element 22 and thus ensure defined positioning.

Figure 23:
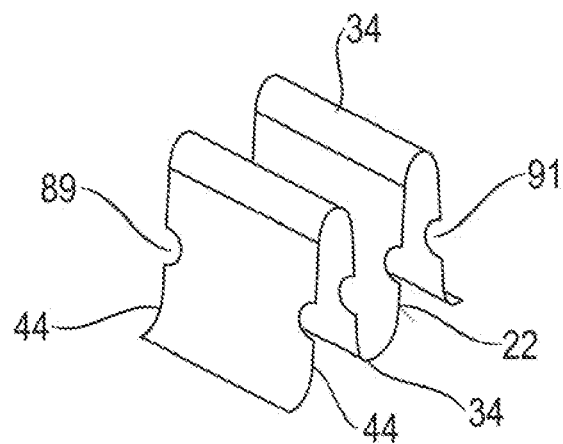
FIG. 23 shows a heating conductor element with a wave-like structure and recesses, formed in end faces of the element, for receiving support elements of a support structure.
Figure 24:
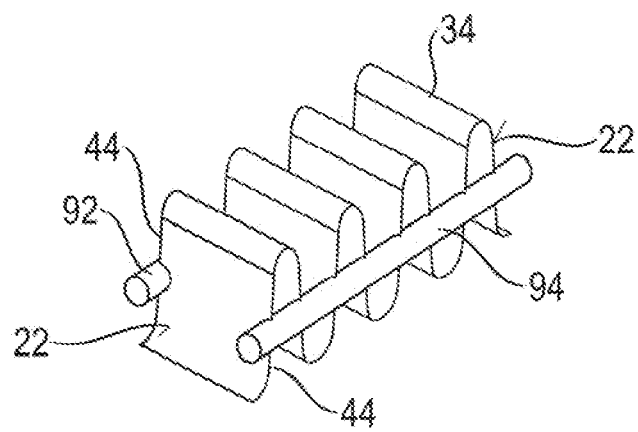
FIG. 24 shows the heating conductor element illustrated in FIG. 23 having support elements engaging in the recesses formed in the end faces.
Figure 25:
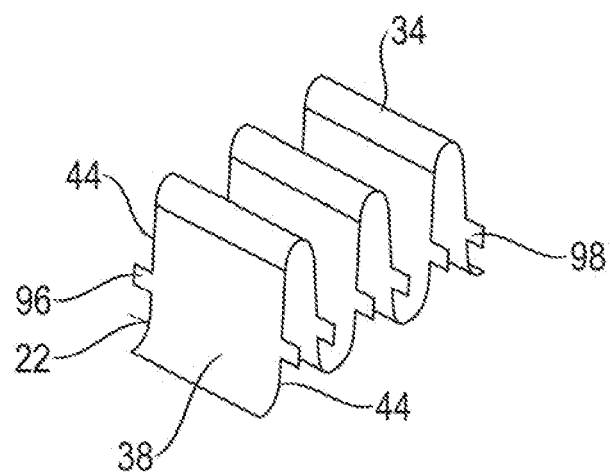
FIG. 25 shows a heating conductor element having connecting projections for support elements provided in the region of end faces of the element; and, FIG. 26 shows the heating conductor element of FIG. 25 having support elements arranged on the end faces of the element.
Figure 26:
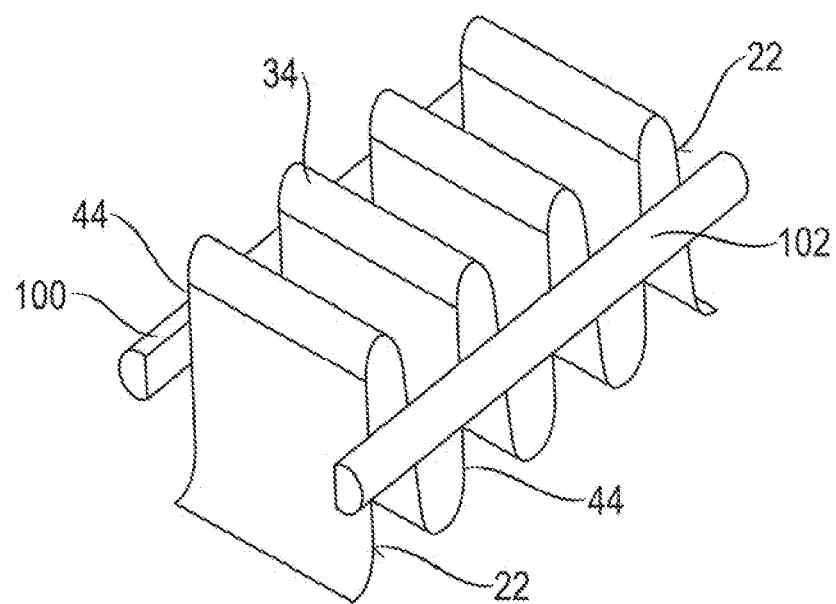

FIGS. 23 and 24 show an embodiment in which respective positioning recesses 89, 91 for receiving in each case one rod-like support element 92, 94 are formed on a heating conductor element 22 in the region of the end faces 44. In the embodiment illustrated in FIGS. 25 and 26, positioning projections 96, 98 are formed on the end faces 44 of the heating conductor element 22, which projections can be positioned in such a way that they engage in respective positioning recesses in rod- or web-like support elements 100, 102 arranged in the region of the end faces 44.

The use of two such rod-like or web-like support elements in the embodiments described with reference to FIGS. 19 to 26 is therefore advantageous since this can also prevent torsion or twisting of a heating conductor element 22. It is self-evident that such a structure with support elements of the support structure that interact with a heating conductor element in various regions thereof can also be used if, in contrast to what is illustrated in FIGS. 19 to 26, the heating conductor element 22 does not have a shape which extends substantially in a straight line but has a curved shape, for example, a spiral shape. Such web-like or rod-like support elements can be integrated into the support structure illustrated, for example, in FIG. 18 or can form a part thereof and can likewise be constructed from ceramic material, for example.

It is indicated schematically in FIG. 19 that, in the case of an exhaust gas heating unit 10 constructed in accordance with the invention, one or more heating conductor elements 22 can be partially or completely coated with catalytically active material 104 on the surface thereof provided for heat transfer. Depending on which catalytic function is to be provided, coating material that is suitable for this purpose can be selected. For example, the heating conductor element 22 coated in this way can be coated with platinum or/and palladium or/and rhodium-containing material to provide a three-way catalyst function. To provide a hydrolysis catalyst function, the catalytically active material can contain titanium oxide or/and zirconium oxide or/and aluminum oxide. Such a hydrolysis catalyst function is advantageous particularly if a urea/water solution is injected upstream of the exhaust gas heating unit 10. To provide a nitrogen oxide storage catalyst function, the catalytically active material 104 can contain platinum or/and palladium or/and barium. To provide a diesel oxidation catalyst function, the catalytically active material can contain platinum or/and palladium. To provide an SCR catalyst function, the catalytically active material 104 can contain iron zeolite or/and copper zeolite or/and vanadium oxide. In order to achieve good adhesion of a coating with such catalytically active material 104 to the heating conductor element 22, it is advantageous to use an alloy with a high aluminum content for the construction material of the heating conductor element 22 and to subject the surface to be coated to a temperature treatment. For example, a so-called FeCr-Alloy 1.4767 can be used as a construction material.

The provision of such a coating with catalytically active material on the surface of a heating conductor element constructed with flat strip material around which exhaust gas can flow ensures that, substantially immediately upon excitation of the heating conductor element and heating thereof, the coating with catalytically active material is also brought to a sufficiently high temperature that the catalytic reaction to be provided by this material begins. This means that a catalytic reaction can already take place in the region of the exhaust gas heating unit in a phase in which an exhaust gas treatment unit following downstream has not yet been sufficiently heated, and thus the proportion of pollutants in the exhaust gas can be reduced.

The structure of an exhaust gas treatment unit according to the invention makes it possible to achieve efficient heating of the exhaust gas emitted by an internal combustion engine since, on the one hand, the exhaust gas heating unit with the at least one heating conductor element made of flat strip material which can be heated by electrical excitation provides a very large surface area for thermal interaction with the exhaust gas and, on the other hand, the exhaust gas can enter directly into thermal interaction with the heating conductor element. The wave-like structure of the at least one heating conductor element and the shape of the at least one heating conductor element, which shape is superimposed on the wave-like structure, for example in the manner of a spiral or meander, make it possible to cover substantially the entire cross section of an exhaust-gas-carrying component or of a housing which accommodates the at least one heating conductor element, through which cross section the exhaust gas flows, or to use it for heat transfer.

It is understood that the foregoing description is that of the preferred embodiments of the invention and that various changes and modifications may be made thereto without departing from the spirit and scope of the invention as defined in the appended claims.

What is claimed is:

1. An exhaust gas heating unit for an exhaust gas system of an internal combustion engine, the exhaust gas heating unit comprising:
   at least one heating conductor element being electrically conductive and configured from bent flat strip material and being configured to have a wave-like structure defining a plurality of peak regions, said at least one heating conductor element defining a plurality of length segments running one adjacent the other;
   electrically insulating material disposed between said length segments running adjacent to one another for electrically insulating said length segments running adjacent to one another with respect to each other;
   a support structure including said electrically insulating material and supporting said at least one heating conductor element in a predetermined position, said support structure in association with each one of two adjacent length segments of said plurality of length segments running one adjacent the other including at least one of the following:
   at least one support element having a plurality of positioning projections engaging between each two mutually adjacent ones of said peak regions of said wave-like structure of said at least one heating conductor element;
   at least one support element having positioning recesses receiving corresponding ones of said peak regions of said wave-like structure of said at least one heating conductor element.

2. The exhaust gas heating unit of claim 1, wherein said exhaust gas system conducts exhaust gas defining an exhaust gas primary flow direction (H) and said exhaust gas heating unit further comprises:
   said at least one heating conductor element having a plurality of broad sides arranged to be parallel to said exhaust gas primary flow direction (H) and a plurality of end faces arranged orthogonally to said exhaust gas primary flow direction (H);
   said exhaust gas heating unit further including at least one of the following:
   said plurality of broad sides having respective extent lengths (b) extending in a width direction (B) and each of said extent lengths (b) lying in a range of 10 mm to 20 mm;
   said plurality of end faces having respective extent lengths (d) lying in a thickness direction (D) and each of said extent lengths (d) lying in a range of 0.05 mm to 0.2 mm;
   a ratio of said extent length (d) in said thickness direction (D) to said extent length (b) in said width direction (B) lying in a range of 0.002 to 0.025;
   said bent flat strip material being metal material or electrically conductive ceramic material;
   said bent flat strip material providing an electrically non-insulated surface for the exhaust gas to flow therearound; and,
   said at least one conductor element having longitudinal end regions configured for electrical connection to a voltage source.

3. The exhaust gas heating unit of claim 1, wherein said at least one heating conductor element is arranged in a spiral to define a spiral configuration having a spiral center (Z); and, said length segments are provided by winding sections which are radially adjacent to one another with respect to said spiral center (Z).

4. The exhaust gas heating unit of claim 1, wherein said at least one heating conductor element is arranged in a meandering shape; and, said length segments are provided by meander sections which run next to one another and are connected to one another in transition regions.

5. The exhaust gas heating unit of claim 1, wherein said electrically insulating material is flat strip material.

6. The exhaust gas heating unit of claim 1, further comprising:
   a plurality of said heating conductor elements each being configured from bent flat strip material; and,
   said plurality of heating conductor elements being arranged so as to be electrically insulated with respect to one another.

7. The exhaust gas heating unit of claim 6, wherein a selected number of said heating conductor elements are connected in parallel with one another.

8. The exhaust gas heating unit of claim 6, wherein said heating conductor elements are arranged one adjacent to the other in a spiral configuration starting from a spiral center (Z) so as to cause said heating conductor elements to form mutually adjacent spiral arms.

9. The exhaust gas heating unit of claim 6, wherein said heating conductor elements have respective length regions which are elongated linearly and run next to one another.

10. The exhaust gas heating unit of claim 6, further comprising at least one of the following:
    said heating conductor elements being arranged to conjointly define an interspace therebetween to electrically insulate said heating conductor elements with respect to each other; and,
    electrically insulating material disposed between said heating conductor elements to electrically insulate said heating conductor elements with respect to one another.

11. The exhaust gas heating unit of claim 10, wherein said electrically insulating material is a flat strip material.

12. The exhaust gas heating unit of claim 1, wherein
    said peak regions have respective positioning recesses formed therein; and,
    said at least one support element engages in said positioning recesses.

13. The exhaust gas heating unit of claim 1, wherein said at least one heating conductor element is configured to have said wave-like structure defining said plurality of peak regions and defining a plurality of wave surface sections and a corresponding one of said wave surface sections running between each two mutually adjacent ones of said peak regions; and, said support structure includes at least one support element held on said wave surface sections.

14. The exhaust gas heating unit of claim 13, wherein said wave surface sections and said peak regions conjointly define an end face of said heating conductor element; and, said exhaust gas heating unit further comprises at least one of the following:
    said at least one support element passing through said wave surface section; and,
    said at least one support element being supported on said end face of said at least one heating conductor element in the region of the wave surface sections.

15. The exhaust gas heating unit of claim 13, wherein said wave surface sections and said peak regions conjointly define an end face of said heating conductor element; said support structure comprises at least one support element arranged on said end face of said at least one heating conductor element; and, a plurality of support arms.

16. The exhaust gas heating unit of claim 15, wherein said plurality of support arms are arranged in a star configuration.

17. The exhaust gas heating unit of claim 1, wherein said at least one heating conductor element is coated with a catalytically active material at least in one or more regions thereof.

18. The exhaust gas heating unit of claim 17, wherein said catalytically active material comprises at least one of the following:
   at least one of platinum, palladium and rhodium to provide a three-way catalytic function;
   at least one of titanium oxide, zirconium oxide and aluminum oxide to provide a hydrolysis catalyst function;
   at least one of platinum, palladium and barium to provide a nitrogen oxide catalyst function;
   at least one of platinum and palladium to provide a diesel oxygen catalyst function; and,
   at least one of iron zeolite, copper zeolite and vanadium oxide to provide an SCR catalyst function.

19. An exhaust gas system for an internal combustion engine, the exhaust gas system comprising:
   an exhaust gas heating unit including at least one heating conductor element
   being electrically conductive and configured from bent flat strip material and being configured to have a wave-like structure defining a plurality of peak regions, said at least one heating conductor element defining a plurality of length segments running one adjacent the other;
   electrically insulating material disposed between said length segments running adjacent to one another for electrically insulating said length segments running adjacent to one another with respect to each other;
   a support structure including said electrically insulating material and supporting said at least one heating conductor in a predetermined position, said support structure in association with each one of two adjacent length segments of said plurality of length
   segments running one adjacent the other including at least one of the following:
   at least one support element having a plurality of positioning projections engaging between each two mutually adjacent ones of said peak regions of said wave-like structure of said at least one heating conductor element;
   at least one support element having positioning recesses receiving corresponding ones of said peak regions of said wave-like structure of said at least one heating conductor element.

20. The exhaust gas system of claim 19, further comprising:
   at least one exhaust gas treatment unit; and,
   said exhaust gas heating unit being arranged upstream of said at least one exhaust gas treatment unit.

21. The exhaust gas system of claim 20, wherein said at least one exhaust gas treatment unit comprises at least one of a catalytic converter and a particle filter.

22. The exhaust gas system of claim 19, wherein:
   said exhaust gas system conducts exhaust gas defining an exhaust gas primary flow direction (H) and said at least one heating conductor element of said at least one exhaust gas heating unit is arranged parallel to said exhaust gas primary flow direction (H); and,
   said at least one heating conductor element has a plurality of broad sides extending in a width direction (B) and arranged to be parallel to said exhaust gas primary flow direction (H) and a plurality of end faces lying in a thickness direction (D) and arranged orthogonally to said exhaust gas primary flow direction (H).

23. An exhaust gas heating unit for an exhaust gas system of an internal combustion engine, the exhaust gas heating unit comprising:
   a plurality of heating conductor elements, said heating conductor elements of said plurality of heating conductor elements being electrically conductive and configured from bent flat strip material such as to have a wave-like structure defining a plurality of peak regions, said heating conductor elements of said plurality of heating conductor elements being arranged so as to be electrically insulated with respect to one another;
   electrically insulating material disposed between said heating conductor elements of said plurality of heating conductor elements to electrically insulate said heating conductor elements of said plurality of heating conductor elements with respect to one another;
   a support structure including said electrically insulating material and supporting said heating conductor elements of said plurality of heating conductor elements in a predetermined position, said support structure in association with each one of two adjacent heating conductor elements of said plurality of heat conductor elements including at least one of the following:
   at least one support element having a plurality of positioning projections engaging between each two mutually adjacent ones of said peak regions of said wave-like structures of said adjacent heating conductor elements of said plurality of heat conductor elements;
   at least one support element having positioning recesses receiving corresponding ones of said peak regions of said wave-like structures of said adjacent heating conductor elements of said plurality of heating conductor elements.

* * * * *

UNITED STATES PATENT AND TRADEMARK OFFICE
CERTIFICATE OF CORRECTION

PATENT NO. : 12,049,839 B2
APPLICATION NO. : 17/545786
DATED : July 30, 2024
INVENTOR(S) : Gerd Gaiser Page 1 of 1

It is certified that error appears in the above-identified patent and that said Letters Patent is hereby corrected as shown below:

In the Specification

In Column 8:
Line 12: delete "Fe/Cr/AI" and insert -- Fe/Cr/Al --

Signed and Sealed this
Fifth Day of August, 2025

Coke Morgan Stewart
*Acting Director of the United States Patent and Trademark Office*